(12) United States Patent
Thorell

(10) Patent No.: US 7,934,197 B2
(45) Date of Patent: Apr. 26, 2011

(54) MAINTAINING CODE INTEGRITY IN A CENTRAL SOFTWARE DEVELOPMENT SYSTEM

(75) Inventor: Per Thorell, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1162 days.

(21) Appl. No.: 11/612,816

(22) Filed: Dec. 19, 2006

(65) Prior Publication Data

US 2008/0148060 A1  Jun. 19, 2008

(51) Int. Cl.
*G06F 9/44* (2006.01)
*G06F 7/04* (2006.01)
*H04L 9/32* (2006.01)

(52) U.S. Cl. ............... 717/120; 726/29; 713/176

(58) Field of Classification Search .......... 717/168, 717/174, 120; 707/698; 713/155, 176; 380/282; 726/29

See application file for complete search history.

(56) References Cited

U.S. PATENT DOCUMENTS

| | | | | |
|---|---|---|---|---|
| 6,157,721 A * | 12/2000 | Shear et al. | ............ | 380/255 |
| 6,321,334 B1 * | 11/2001 | Jerger et al. | ............ | 726/1 |
| 6,367,012 B1 * | 4/2002 | Atkinson et al. | ............ | 713/176 |
| 6,374,402 B1 * | 4/2002 | Schmeidler et al. | ............ | 717/167 |

(Continued)

FOREIGN PATENT DOCUMENTS

| | | |
|---|---|---|
| EP | 1211587 | 6/2002 |
| EP | 1645931 | 4/2006 |
| WO | 01/10076 | 2/2001 |

OTHER PUBLICATIONS

Usuda K. et al. "Proposal of an Automatic Signature Scheme Using a Compiler." IEICE Transactions on Fundamentals of Electronics, Communications and Computer Sciences, Engineering Sciences Society, Tokyo, JP, vol. E79-A, No. 1, Jan. 1996. XP000558724. ISSN:0916-8508.

(Continued)

*Primary Examiner* — Wei Y Zhen
*Assistant Examiner* — Chih-Ching Chow
(74) *Attorney, Agent, or Firm* — Coats & Bennett, P.L.L.C.

(57) ABSTRACT

A central software development system comprises a code processor and a code authenticator. The code processor converts modified free source code received by the system to program code such as executable code or bytecode. The code authenticator selectively signs the program code using an encryption key associated with one or more devices for which the program code is designed, e.g., a computer or mobile phone. The central system may also include a code scanner. The code scanner verifies the modified free source code, e.g., by scanning the modified free source code or intermediate code generated by the code processor for impermissible code patterns. The code authenticator signs the program code if the modified free source code is verified. The impermissible code patterns may correspond to at least one of proprietary, malicious or virulent code sequences.

15 Claims, 5 Drawing Sheets

U.S. PATENT DOCUMENTS

| | | | |
|---|---|---|---|
| 6,732,328 B1* | 5/2004 | McEwen et al. | 714/795 |
| 6,792,543 B2 | 9/2004 | Pak et al. | |
| 6,987,963 B2 | 1/2006 | Kouznetsov et al. | |
| 7,213,047 B2* | 5/2007 | Yeager et al. | 709/202 |
| 7,287,166 B1* | 10/2007 | Chang et al. | 713/187 |
| 7,461,249 B1* | 12/2008 | Pearson et al. | 713/156 |
| 2002/0053024 A1 | 5/2002 | Hashimoto et al. | |
| 2002/0157008 A1 | 10/2002 | Radatti et al. | |
| 2003/0050932 A1* | 3/2003 | Pace et al. | 707/100 |
| 2004/0181677 A1 | 9/2004 | Hong et al. | |
| 2005/0091501 A1 | 4/2005 | Osthoff et al. | |
| 2006/0150144 A1 | 7/2006 | Balathandapani et al. | |
| 2007/0180509 A1* | 8/2007 | Swartz et al. | 726/9 |
| 2008/0025515 A1* | 1/2008 | Coombs | 380/277 |

OTHER PUBLICATIONS

Kawaguchi, Shinji et al. "MUDABlue: An Automatic Categorization System for Open Source Repositories." Journal of Systems and software, vol. 79, No. 7 (Jul. 2006), pp. 939-953.

Moessner, K. et al. "Terminal Reconfigureability—The Software Download Aspect." First International Conference on 3G Mobile Communication Technologies, pp. 326-330, Mar. 27-29, 2000, ISBN: 0 85296 726 8.

* cited by examiner

MAINTAINING CODE INTEGRITY IN A CENTRAL SOFTWARE DEVELOPMENT SYSTEM

BACKGROUND

The present invention generally relates to software development, and particularly relates to maintaining code integrity in a central software development system.

Free source code such as open-source code is made generally available under a license permitting licensees to study, modify, and improve the source code and to redistribute the source code in modified or unmodified form. Original source code and various modified versions thereof are conventionally maintained by a central software development system for open distribution to licensed entities. A licensee downloads desired source code from the central system to the licensee's system for modification. Once modified, the licensee may remotely compile the modified source code into program code (software) or upload the modified code to the central system for compilation. If the modified source code is uploaded to the central system, the system indexes the modified code by version number so that the newly modified code can be easily located and retrieved by other licensees.

Program code created from free source code may be code that is ready for immediate execution (i.e., executable code) or code that requires a final compilation step before the code can be executed (i.e., bytecode). Executable program code is created by compiling the free source code into object code and linking the object code into executable code. Bytecode is created by compiling the free source code into intermediate code which requires further compilation or interpretation before it may be executed.

When a source licensee remotely creates program code from modified free source code, the licensee controls distribution of the program code. As such, the remotely created program code may be signed or otherwise authenticated much the same way proprietary code is authenticated. For example, the code may be signed using a private encryption key uniquely associated with the licensee who generated the program code. A device such as a mobile phone that receives the program code directly from the licensee or other trusted source can verify the authenticity of the code before downloading or executing it. For example, if the signature associated with the code is not trusted or unverifiable, the phone will not install the software.

Program code generated by a central software development system is not conventionally signed by the licensee that modified the underlying free source code. Thus, program code created by a central system conventionally has no indication of authenticity. Further, the very nature of open software development lends itself to the increased likelihood that program code is created from erroneous, malicious or virulent source code since the source code is made available to many entities. Program code created from tainted free source code cannot be trusted. Devices that execute untrustworthy program code are more susceptible to unpredictable behavior and viruses or other types of malicious code attacks than are devices that execute trusted code.

Widespread adoption of the open software development model has increased exposure to inauthentic and untrustworthy code. In some software distribution environments, software developers are provided unfettered access to devices so that software contained in the devices may be readily updated. While this may be advantageous for certain types of software such as application software, unfettered device access poses security risks for other types of software code. For example, in a mobile phone, unrestricted access to the phone's modem telecommunication protocols or boot code may seriously compromise phone security.

SUMMARY

According to the methods, apparatus and computer program product taught herein, code integrity is maintained in a central software development system by authenticating program code generated by the central system. The central system authenticates program code it generates by selectively signing the code using an encryption key associated with the device or devices for which the program code is designed, e.g., a computer or mobile phone. Devices that download program code generated by the central system can thus verify authenticity of the program code before executing it. The central system may also verify the free source code from which program code is generated before the program code is signed, e.g., by scanning for impermissible code patterns. This way, only verified source software is authenticated by the central system. As such, the likelihood that erroneous, malicious, virulent or otherwise undesirable code is executed by devices that download software generated by the central system is reduced.

According to one embodiment of a central software development system, the system comprises a code processor and a code authenticator. The code processor converts modified free source code received by the system to program code. The code authenticator selectively signs the program code using an encryption key associated with one or more devices for which the program code is designed. In one embodiment, the code authenticator signs the program code by selectively calculating a hash value based on the program code and encrypting the hash value using the encryption key. The program code may comprise executable code or bytecode.

The central system may also include a code scanner. The code scanner verifies the modified free source code, e.g., by scanning the modified free source code or intermediate code generated by the code processor for impermissible code patterns. The code authenticator signs the program code if the corresponding modified free source code is verified by the code scanner. The impermissible code patterns may correspond to at least one of proprietary, malicious or virulent code sequences.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
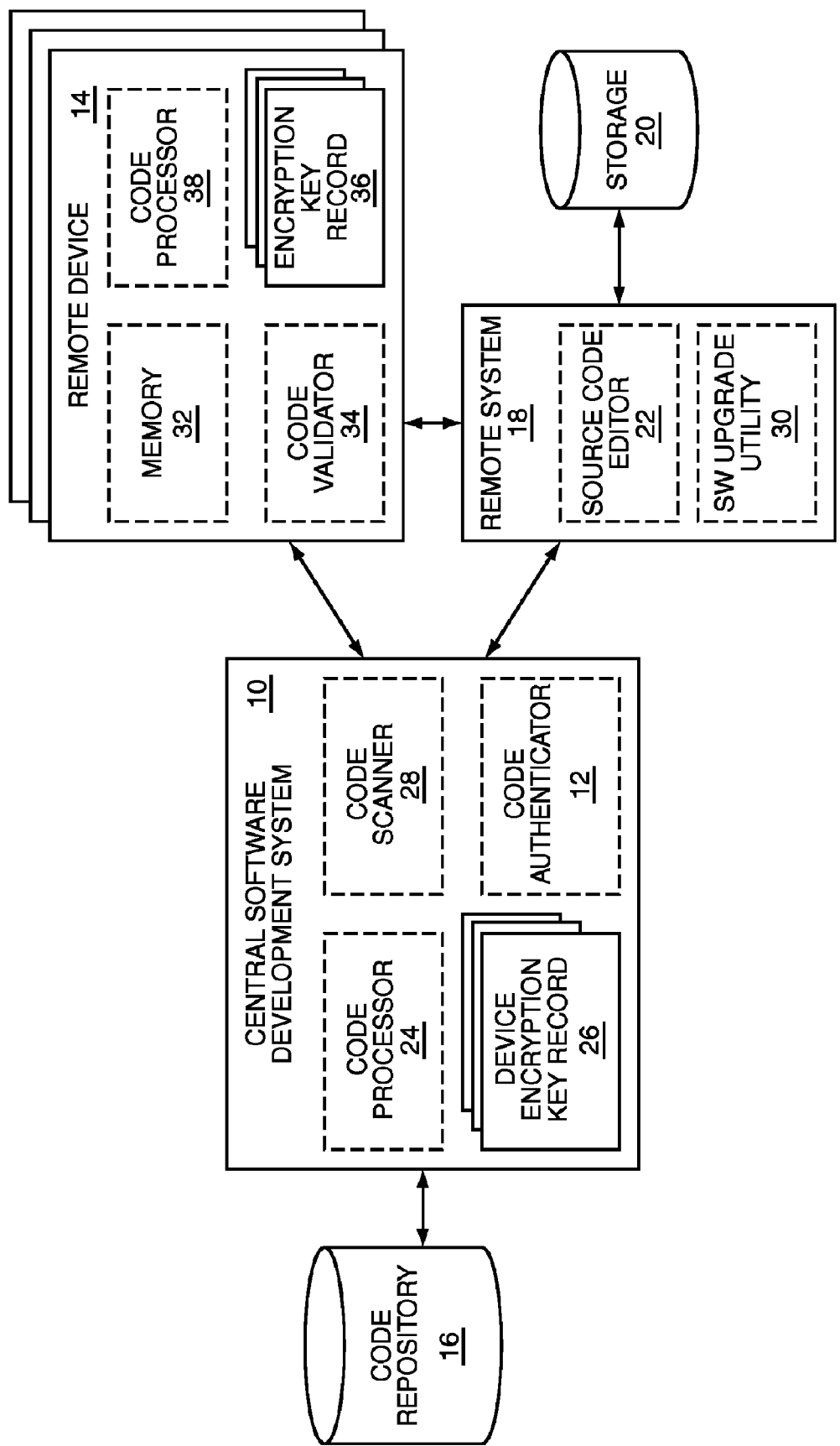
FIG. 1 is a block diagram of one embodiment of a central software development system.

FIG. 1 illustrates an embodiment of a central software development system 10. The central system 10 makes free source code generally available to licensees. As used herein, the term 'free source code' is source code such as open-source code that is made generally available under a license permitting licensees to study, modify, and improve the source code and to redistribute the source code in modified or unmodified form. Modified free source code is returned to the central system 10 for compilation into program code. As used herein, the term 'program code' is code that is ready for execution (executable code) or code that requires a final compilation or interpretation step before it can be executed (bytecode). Regardless, the central system 10 provides a single location for both maintaining modified free source code and building software from modified free source code.

Program code generated by the central system 10 is signed by a code authenticator 12 included in or associated with the system 10 for indicating authenticity of the program code. Thus, recipients of signed program code are provided assurance that the code was generated by a trusted source, i.e., the central system 10. Program code generated by software developers who fail to return modified source code to the central system 10 is not signed by the central system 10, and thus, may not be executed by target devices 14 since it has not been authenticated by the central system 10. Regardless, in one embodiment, the code authenticator 12 signs program code by performing a hash routine on the code and then encrypting the resulting hash value. The encryption key used to sign program code is associated with the device(s) 14 for which the program code is designed or otherwise intended, not the entity that modified the underlying free source code.

The central system 10 may generate program code designed for various types of devices 14 such as computers or embedded devices such as mobile phones, portable computers, handheld devices, network interface cards, etc. The encryption key may be uniquely associated with a single device or group of devices, e.g., all devices having the same model or version number. If each device 14 for which the program code is designed does not recognize the signature associated with the code, each target device 14 may independently choose not to install the code. Thus, program code generated by the central system 10 is authenticated even though it is generated in a centralized, open environment.

In more detail, a code repository 16 included in or associated with the central system 10 stores free source code maintained by the system 10. Licensees gain access to the free source code, e.g., by logging into the central system 10. After logging in, a licensee identifies a particular version of source code to be modified. The desired version of source code is retrieved from the code repository 16 and downloaded to the licensee's remote system 18 and stored in memory 20 included in or associated with the remote system 18. The downloaded source code is then remotely modified, e.g., using a source code editor 22 such as a script editor or the like. The modified source code is subsequently uploaded to the central system 10. Alternatively, a code processor 24 included in or associated with the central system 10 locally modifies the source code at the central system 10.

Either way, the central system 10 assigns a version number to the newly modified source code and stores the code in the code repository 16 for subsequent use. The code processor 24 included in or associated with the central system 10 compiles the modified source code into program code. The code authenticator 12 then signs the newly created program code using the encryption key associated with each device 14 for which the program code is designed or otherwise intended. The encryption key may be a public or private encryption key provided to the central system 10 or generated by the system 10. Regardless, various encryption key records 26 maintained by the central system 10 are searched until the key corresponding to each target device 14 is found.

In one embodiment, a code scanner 28 included in or associated with the central system 10 verifies the free source code from which the program code is generated before the program code is signed using the retrieved encryption key. The code scanner 28 verifies the free source code by determining whether the source code or code associated with the source code contains impermissible code patterns as will be described in detail later. As such, the code scanner 28 prevents virulent, malicious or otherwise undesired code from being signed by the code authenticator 12. If the code scanner 28 is used, signed program code generated by the central system 10 is thus both verified by the code scanner 28 and authenticated by the code authenticator 12.

Program code is made available for download to each device 14 for which the code was designed. The entity that modified the source code from which the program code was generated may download the program code to the entity's remote system 18. A software upgrade utility 30 included in the remote system 18 then provides the program code to each target device 14 for storage in memory 32. Alternatively, respective ones of the target devices 14 may receive the program code directly from the central system 10 if equipped with a software upgrade utility. Also, the program code may be downloaded from the central system 10 by an unrecognized remote device (not shown) such as a computer and then subsequently transferred via email or other medium to the target device 14. In yet another embodiment, the program code may be stored on a memory card that is subsequently inserted into the target device 14.

Before a target device 14 executes the program code, a code validator 34 included in the device 14 determines whether the program code is signed, and if so, whether the signature is recognized. In one embodiment, the code validator 34 compares encryption key records 36 maintained by the device 14 with the signature generated by the central system 10 and included with the program code. If the signature is not recognized or no signature exists, the target device 14 may choose not to execute the code. This way, program code not generated and signed by the central system 10 is not executed by the target device 14. If the signature is successfully authenticated, a code processor 38 included in the device 14 executes the program code, e.g., by running executable code or compiling (or interpreting) bytecode and then executing the resulting code.

Either way, each target device 14 is shielded from unauthenticated code when the central system 10 signs the program code with an encryption key associated with the corresponding target device 14. The code scanner 28 included in or associated with the central system 10 provides further assurance of code integrity by determining whether the program code contains impermissible code patterns. Thus, when the code scanner 28 is used, signed program code indicates that both the code has been generated by a trusted source (i.e., the central system 10) and the code does not contain impermissible code patterns.

Figure 2:
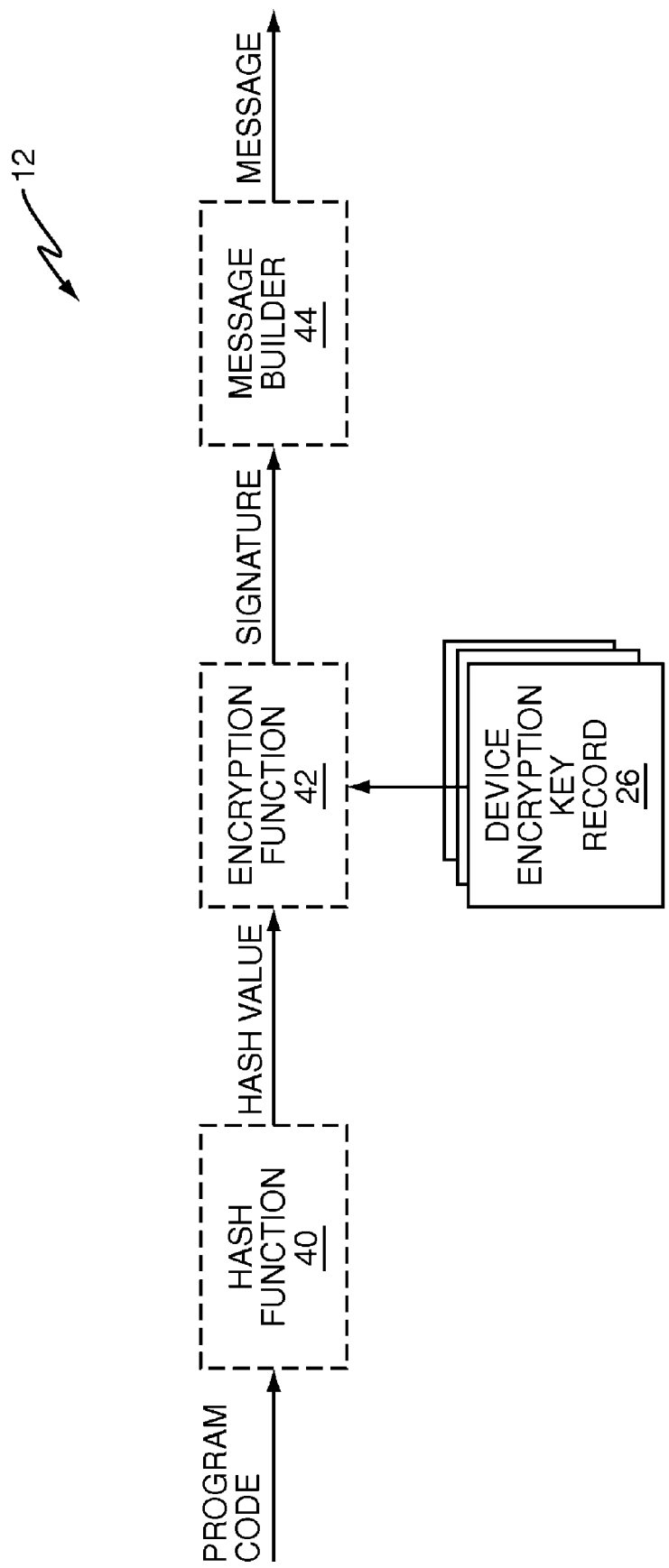
FIG. 2 is a block diagram of one embodiment of a code authenticator included in or associated with the central software development system of FIG. 1.

FIG. 2 illustrates an embodiment of the code authenticator 12 included in or associated with the central system 10. The code authenticator 12 signs program code generated by the central system 10 using a hash function 40 and an encryption function 42. The hash function 40 generates a hash value based on the program code being signed. The hash function

40 is a reproducible function (or algorithm) that generates a digital "fingerprint" (hash value) from data (program code). The resulting hash value is simple to compute given the data being processed, but the data is difficult to reconstruct given only the hash value. The hash function 40 may be any conventional hash function such as SHA-1, MD2, MD4, MD5, Snerfu, H-Hash, etc.

The encryption function 42 encrypts the hash value produced by the hash function 40 to generate a digital signature. The digital signature indicates that the program code was generated by a trusted party such as the central system 10. During operation, the encryption function 42 retrieves the encryption key associated with each device 14 for which the program code is designed, e.g., as indicated by the version of the program code or underlying free source code. For example, if the code version corresponds to a particular mobile phone model, the encryption key record 26 associated with that model is retrieved. Regardless, the key used to encrypt the hash value corresponds to the device for which the code is designed or otherwise intended, not the entity that modified the underlying source code. Once the proper key record 26 has been retrieved, the hash value is encrypted using the retrieved key. Any conventional encryption algorithm may be used such as, RSA, Pretty Good Privacy (PGP), ElGamal, DSA, Fiege-Fiat-Shamir, etc.

A message builder 44 constructs a composite message containing the program code, the digital signature, and optional information such as a header and/or digital certificate identifying the encryption key used to sign the program code. The message is provided either directly or indirectly to each device 14 for which the code is designed as previously described. A code validator 34 included in each target device 14 verifies whether the signature associated with the program code is recognized. For example, the code validator 34 may compare the program code signature to various encryption key records 36 maintained by the target device(s) 14. Alternatively, if a digital certificate is provided with the program code and corresponding signature as part of a received message, the code validator 34 may compare the program code signature to a signature included in the digital certificate. Regardless, if the signature associated with program code generated by the central system's code processor 24 is not recognized by a target device 14, the code may not be executed.

Figure 3:
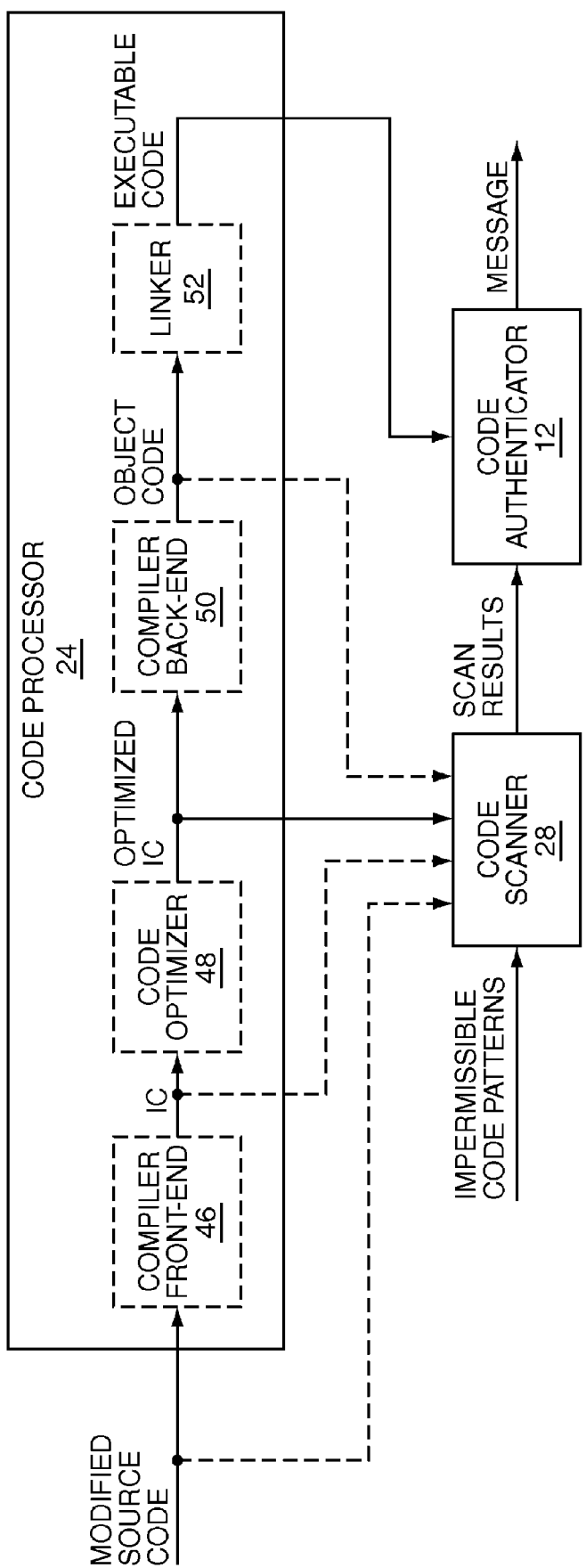
FIG. 3 is a block diagram of one embodiment of a code processor included in or associated with the central software development system of FIG. 1.

FIG. 3 illustrates one embodiment of the code processor 24 included in or associated with the central system 10. According to this embodiment, the code processor 24 generates executable code from a particular version of modified free source code. To that end, the code processor 24 comprises a compiler front-end 46, code optimizer 48, compiler back-end 50 and linker 52. The compiler front-end 46 translates modified free source code into intermediate code (IC), e.g., as illustrated by Step 100 of FIG. 4. As used herein, the term 'intermediate code' should be interpreted broadly to include any code represented using a language lower than source code language, but higher than executable code language such as assembly language or machine language. The intermediate code is preferably hardware and operating system independent, thus enabling different types of source code to be generally optimized regardless of hardware and software limitations.

The code optimizer 48 optimizes the intermediate code, e.g., using any conventional code optimization technique such as inline expansion, dead code elimination, constant propagation, loop transformation, register allocation, automatic parallelization etc. After the intermediate code has been optimized, the compiler back-end 50 generates object code from the optimized intermediate code, the object code being based on the native machine language supported by the device(s) 14 for which the code is designed. The linker 52 assembles the object code (and libraries) into executable code suitable for execution by each target device 14. Alternatively, the code processor 24 skips intermediate code transformation and instead directly compiles the modified free source code into executable code. Either way, the code scanner 28 included in or associated with the central system 10 may verify the free source code before the code authenticator 12 signs the corresponding program code.

Figure 4:
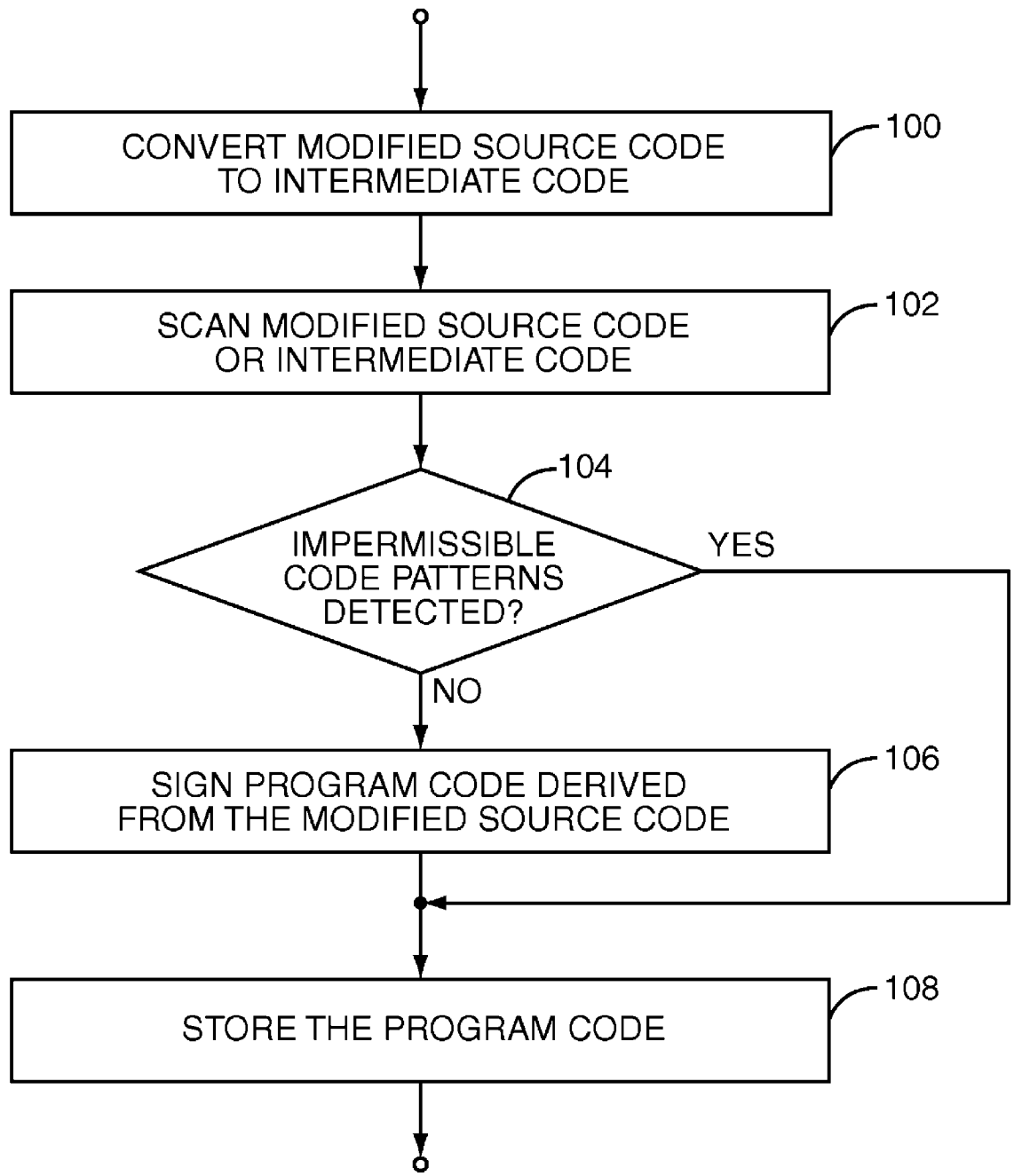
FIG. 4 illustrates one embodiment of processing logic for authenticating program code generated by the central software development system of FIG. 1.

The code scanner 28 verifies the modified free source code by scanning corresponding intermediate code or the source code itself for impermissible patterns, e.g., as illustrated by Step 102 of FIG. 4. For example, the code scanner 28 may scan intermediate code such as the code output by the compiler front-end 46, code optimizer 48, or compiler back-end 50. Impermissible code patterns correspond to any kind of code sequence that indicates the code should not be executed by the device(s) 14 for which the code is intended. Impermissible code patterns may correspond to proprietary code sequences that should not be modified by un-trusted third parties, e.g., boot code or the modem telecommunication protocols associated with a mobile phone or other wireless communication device. If such proprietary source code is modified absent control, device operation may be compromised. Impermissible code patterns may also correspond to any kind of erroneous or malicious code sequences such as those associated with known software viruses.

During or after code scanning, the code scanner 28 determines whether impermissible code patterns have been detected, e.g., as illustrated by Step 104 of FIG. 4. In one embodiment, the code scanner 28 compares the code being scanned to one or more groups of regular expressions representing impermissible code patterns. A regular expression is an ordered sequence of symbols that describes or matches a set of strings according to certain syntax rules. As such, an impermissible code pattern may be represented by a group of regular expressions. The code scanner 28 may detect an impermissible code pattern by determining that each regular expression in a group matches a particular code string in the scanned code. If a match for at least one of the regular expressions in the group is not identified, then no impermissible code patterns are detected for the particular group of regular expressions.

Regardless, code scan results are provided to the code authenticator 12. If no impermissible patterns are found during code scanning, the modified free source code has been verified. Accordingly, the code authenticator 12 signs the executable code as previously described, e.g., as illustrated by Step 106 of FIG. 4. However, if one or more impermissible patterns are found, the executable code cannot be trusted, and thus, the executable code is not signed by the code authenticator 12. Further, if new code patterns are provided to the code scanner 28, prior versions of the source code may be scanned for the new patterns. Also, if impermissible code patterns are detected, action may be taken against the entity that provided the underlying source code to the system 10, e.g., by denying further access to the system 10 or code stored in the code repository 16. Regardless, the executable code is then stored in the central system 10 either with or without a signature, e.g., as illustrated by Step 108 of FIG. 4.

Figure 5:
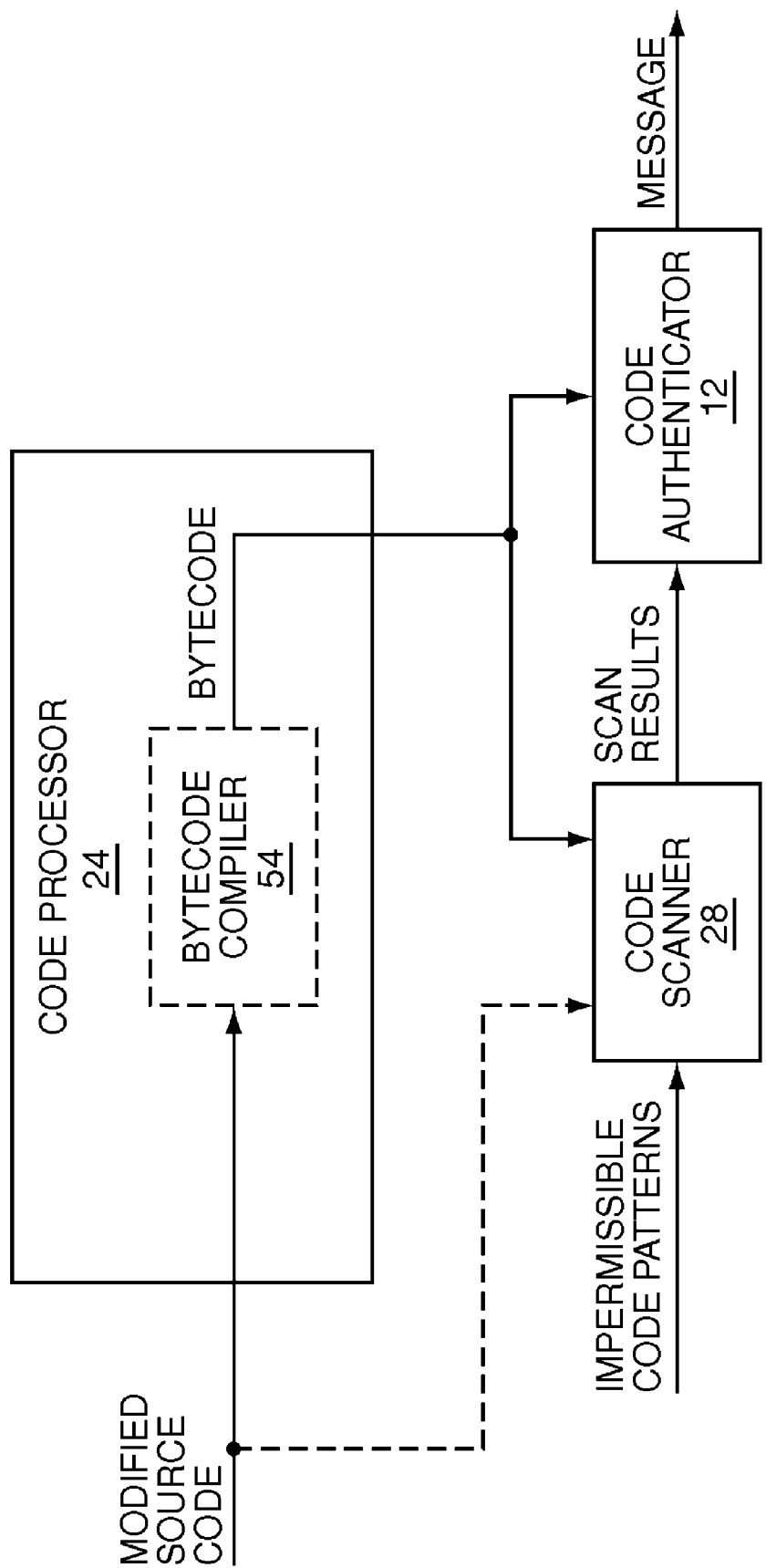
FIG. 5 is a block diagram of another embodiment of a code authenticator included in or associated with the central software development system of FIG. 1.

FIG. 5 illustrates another embodiment of the code processor 24 included in or associated with the central system 10. According to this embodiment, a bytecode compiler 54 generates bytecode from modified free source code, e.g., as illustrated by Step 100 of FIG. 4. The bytecode must be finally compiled before it can execute, and thus, is intermediate code. Typically, a just-in-time compiler is used for compiling bytecode into executable code in real-time. Regardless, the code scanner 28 scans either intermediate code generated by the code processor 24 (i.e., bytecode in this embodiment) or the underlying free source code, e.g., as illustrated by Step 102 of FIG. 4. The code scanner 28 then determines whether impermissible patterns were found during code scan, e.g., as illustrated by Step 104 of FIG. 4. If no impermissible patterns are found, the code authenticator 12 signs the bytecode, e.g., as illustrated by Step 106 of FIG. 4. Otherwise, the bytecode is not signed. The bytecode is then stored in the central system 10 either with or without a signature, e.g., as illustrated by Step 108 of FIG. 4.

The code authenticator 12, code processor 24 and/or code scanner 28 included in or associated with the central software development system 10 described herein may comprise one or more microprocessors, digital signal processors, application specific integrated circuits, field programmable gate arrays, and/or other types of digital processing circuits, configured according to computer program instructions implemented in software (or firmware).

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of maintaining code integrity in a central software development system, comprising:
   scanning modified free source code received by the system for impermissible code patterns by comparing at least one of the modified free source code or intermediate code generated from the modified free source code to one or more groups of regular expressions representing the impermissible code patterns, each regular expression being an ordered sequence of symbols describing or matching a set of strings according to certain syntax rules;
   determining if the modified free source code or the intermediate code includes one or more of the impermissible code patterns based on whether a match occurs between the source code or the intermediate code and one or more of the regular expressions during scanning;
   converting the modified free source code to program code; and
   signing the program code if no impermissible code patterns are found in the modified free source code using an encryption key associated with one or more devices for which the program code is designed.

2. The method of claim 1, wherein scanning for impermissible code patterns comprises scanning at least one of the modified free source code or the intermediate code for at least one of proprietary, malicious or virulent code sequences.

3. The method of claim 1, wherein scanning the intermediate code for impermissible code patterns comprises scanning one of bytecode, an intermediate representation of the modified free source code, or an optimized version of the intermediate representation.

4. The method of claim 1, further comprising taking action against an entity that provided the modified free source code to the system responsive to one or more of the impermissible code patterns being detected.

5. The method of claim 1, wherein signing the program code if no impermissible code patterns are found in the modified free source code comprises:
   selectively calculating a hash value based on the program code; and
   encrypting the hash value using the encryption key.

6. The method of claim 1, wherein converting the modified free source code to the program code comprises converting the modified free source code to one of executable code or bytecode.

7. A central software development system, comprising:
   a processor;
   a code scanner configured to scan modified free source code received by the system for impermissible code patterns by comparing at least one of the modified free source code or intermediate code generated from the modified free source code to one or more groups of regular expressions representing the impermissible code patterns, each regular expression being an ordered sequence of symbols describing or matching a set of strings according to certain syntax rules, and determine if the modified free source code or the intermediate code includes one or more of the impermissible code patterns based on whether a match occurs between the source code or the intermediate code and one or more of the regular expressions during scanning;
   a code processor configured to convert modified free source code received by the system to program code; and
   a code authenticator configured to sign the program code if no impermissible code patterns are found in the modified free source code using an encryption key associated with one or more devices for which the program code is designed.

8. The system of claim 7, wherein the impermissible code patterns correspond to at least one of proprietary, malicious or virulent code sequences.

9. The system of claim 7, wherein the intermediate code comprises one of bytecode, an intermediate representation of the modified free source code, or an optimized version of the intermediate representation.

10. The system of claim 7, wherein the system is configured to take action against an entity that provided the modified free source code to the system responsive to the code scanner detecting one or more of the impermissible code patterns.

11. The system of claim 7, wherein the code authenticator is configured to selectively calculate a hash value based on the program code and encrypt the hash value using the encryption key.

12. The system of claim 7, wherein the program code comprises one of executable code or bytecode.

13. A computer program product implemented on a microprocessor for maintaining code integrity in a central software development system, comprising:
   computer readable program code for scanning modified free source code received by the system for impermissible code patterns by comparing at least one of the modified source code or intermediate code generated from the modified free source code to one or more groups of regular expressions representing the impermissible code patterns, each regular expression being an ordered sequence of symbols describing or matching a set of strings according to certain syntax rules;
   computer readable program code for determining if the modified free source code or the intermediate code includes one or more of the impermissible code patterns based on whether a match occurs between the source code or the intermediate code and one or more of the regular expressions during scanning;

computer readable program code for converting the modified free source code to program code; and computer readable program code for signing the program code if no impermissible code patterns are found in the modified free source code using an encryption key associated with one or more devices for which the program code is designed.

14. The computer program product of claim 13, further comprising computer readable program code for taking action against an entity that provided the modified free source code to the system responsive to one or more of the impermissible code patterns being detected.

15. The computer program product of claim 13, wherein the computer readable program code for signing the program code if no impermissible code patterns are found in the modified free source code using the encryption key comprises computer readable program code for selectively calculating a hash value based on the program code and encrypting the hash value using the encryption key.

* * * * *